United States Patent
Ku et al.

(10) Patent No.: US 9,534,542 B2
(45) Date of Patent: Jan. 3, 2017

(54) SYSTEMS AND METHODS FOR EGR CONTROL

(71) Applicant: Ford Global Technologies, LLC, Dearborn, MI (US)

(72) Inventors: Kim Hwe Ku, West Boomfield, MI (US); Daniel Joseph Styles, Canton, MI (US); Brad Alan Boyer, Canton, MI (US); Gregory Patrick McConville, Ann Arbor, MI (US); Joseph Norman Ulrey, Dearborn, MI (US); James Douglas Ervin, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 14/454,240

(22) Filed: Aug. 7, 2014

(65) Prior Publication Data
US 2016/0040607 A1    Feb. 11, 2016

(51) Int. Cl.
*F02M 26/43*    (2016.01)
*F02D 13/02*    (2006.01)
(Continued)

(52) U.S. Cl.
CPC ......... *F02D 13/0276* (2013.01); *F02D 41/008* (2013.01); *F02D 41/0065* (2013.01); *F02M 25/0706* (2013.01); *F02M 25/0771* (2013.01); *F02M 26/05* (2016.02); *F02M 26/07* (2016.02); *F02M 26/43* (2016.02);
(Continued)

(58) Field of Classification Search
CPC .... F02M 26/43; F02M 25/0771; F02M 26/02; F02M 26/03; F02M 26/04; F02M 26/05; F02M 26/06; F02M 26/07; F02M 26/08; F02M 26/09; F02M 25/0704; F02M 25/0705; F02M 25/0706; F02M 25/0707; F02M 25/0709; F02M 25/071; F02M 25/0711; F02M 25/0712; F02D 13/0276; F02D 41/0065
See application file for complete search history.

(56) References Cited

U.S. PATENT DOCUMENTS

| 4,194,472 A | 3/1980 | Amano et al. |
|---|---|---|
| 6,138,650 A | 10/2000 | Bailey |

(Continued)

OTHER PUBLICATIONS

Alger, Terry et al., "Dedicated EGR: A New Concept in High Efficiency Engines," SAE Technical Paper Series No. 2009-01-0694, Southwest Research Institute, 12 pages.

(Continued)

*Primary Examiner* — Hung Q Nguyen
*Assistant Examiner* — Xiao Mo
(74) *Attorney, Agent, or Firm* — Julia Voutyras; Alleman Hall McCoy Russell & Tuttle LLP

(57) ABSTRACT

Methods and systems are provided for varying a location and rate of EGR delivered to an engine from a dedicated EGR cylinder. The dedicated EGR cylinder is configured with a plurality of exhaust valves controlled via a cam profile switching mechanism that allows the time and duration of opening of each exhaust valve to be varied. By selectively opening one exhaust valve at a time, exhaust from the dedicated EGR cylinder can be delivered to a pre-compressor location, a post-compressor location, or to the exhaust manifold, while bypassing all engine cylinders.

18 Claims, 8 Drawing Sheets

(51) Int. Cl.
*F02M 25/07* (2006.01)
*F02D 41/00* (2006.01)

(52) U.S. Cl.
CPC .... *F02D 41/0007* (2013.01); *F02D 2041/001* (2013.01); *F02M 26/23* (2016.02); *Y02T 10/18* (2013.01); *Y02T 10/47* (2013.01)

(56) References Cited

U.S. PATENT DOCUMENTS

| | | | |
|---|---|---|---|
| 6,543,230 B1 | 4/2003 | Schmid | |
| 8,291,891 B2 | 10/2012 | Alger, II et al. | |
| 8,539,768 B2 | 9/2013 | Hayman et al. | |
| 8,561,599 B2 | 10/2013 | Gingrich et al. | |
| 8,601,811 B2* | 12/2013 | Pursifull | F02D 13/0249 60/602 |
| 9,080,523 B1* | 7/2015 | Ulrey | F02D 13/0242 |
| 9,297,320 B2* | 3/2016 | Hilditch | F02D 41/0052 |
| 2005/0000497 A1* | 1/2005 | Nakai | F02B 31/085 123/568.12 |
| 2009/0020263 A1* | 1/2009 | Ohsawa | F28D 1/0435 165/104.11 |
| 2009/0199825 A1* | 8/2009 | Piper | F02D 9/04 123/568.21 |
| 2009/0308070 A1* | 12/2009 | Alger, II | F02D 13/0238 60/602 |
| 2010/0064685 A1* | 3/2010 | Auffret | F02B 29/0412 60/602 |
| 2011/0041495 A1* | 2/2011 | Yager | F02B 29/0437 60/605.2 |
| 2012/0078492 A1* | 3/2012 | Freund | F02D 41/0065 701/108 |
| 2012/0204844 A1 | 8/2012 | Gingrich et al. | |
| 2012/0204845 A1* | 8/2012 | Gingrich | F02M 26/43 123/568.17 |
| 2012/0216530 A1* | 8/2012 | Flynn | F02M 25/0722 60/605.2 |
| 2012/0285163 A1 | 11/2012 | Hayman et al. | |
| 2013/0000614 A1* | 1/2013 | Freund | F02D 21/08 123/568.2 |
| 2013/0030672 A1* | 1/2013 | Klingbeil | F02D 41/0085 701/109 |
| 2013/0061823 A1* | 3/2013 | Hayman | F02F 1/108 123/58.1 |
| 2013/0220286 A1 | 8/2013 | Gingrich et al. | |
| 2013/0340727 A1 | 12/2013 | Keating | |
| 2014/0142833 A1* | 5/2014 | Gingrich | F02D 41/0255 701/103 |
| 2014/0260242 A1* | 9/2014 | Chadwell | F02B 37/12 60/605.1 |

OTHER PUBLICATIONS

Glugla, Chris P., "Method and System for Pre-Ignition Control," U.S. Appl. No. 14/289,290, filed May 28, 2014, 40 pages.

Leon, Thomas G. et al., "Systems and Methods for Dedicated EGR Cylinder Valve Control," U.S. Appl. No. 14/297,232, filed Jun. 5, 2014, 36 pages.

\* cited by examiner

| Mode | Valve On | Valves Off | Configuration A (no integrated CAC) | Configuration B (with integrated CAC) |
|---|---|---|---|---|
| A | First | Second and Third | HP-EGR (hot) | HP-EGR (cooled) |
| B | Second | First and Third | LP-EGR (cooled pre-compressor) | LP-EGR (cooled in I-CAC) |
| C | Third | First and Second | Exhaust to catalyst only | Exhaust to catalyst only |

FIG. 6

SYSTEMS AND METHODS FOR EGR CONTROL

FIELD

The present description relates to systems and methods for improving EGR control in engine systems configured with a dedicated cylinder group for providing external EGR to other engine cylinders.

BACKGROUND AND SUMMARY

Engines may be configured with exhaust gas recirculation (EGR) systems to divert at least some exhaust gas from an engine exhaust manifold to an engine intake manifold. By providing a desired engine dilution, such systems reduce engine knock, in-cylinder heat losses, throttling losses, as well as NOx emissions. As a result, fuel economy is improved, especially at higher levels of engine boost. However, cooled EGR is limited by the ability of the combustion system to maintain acceptable stability and combustion rates while diluted with EGR.

Engines have also been configured with a sole cylinder (or cylinder group) that is dedicated for providing external EGR to other engine cylinders. Therein, exhaust from only the dedicated cylinder group is recirculated to remaining engines. As such, this allows a substantially fixed amount (e.g., percent) of EGR to be provided to engine cylinders at most operating conditions. By adjusting the fueling of the dedicated EGR cylinder group, the EGR composition can be varied. In particular, the dedicated cylinder can be operated richer than stoichiometry to produce more combustible species, such as hydrogen and carbon monoxide, which when rerouted to the engine intake can increase EGR tolerance. As such, this further improves the fuel economy benefit coming from EGR by decreasing combustion instability and burn durations while increasing allowable EGR rates.

One example of a boosted engine system having dedicated EGR cylinder capabilities is shown by Gingrich et al. in US 20120204844. Therein, exhaust gas from a dedicated EGR cylinder is mixed with boosted air from a compressor at a location upstream of a charge air cooler and upstream of an intake throttle so that cooled EGR can be delivered to the engine.

However, the inventors herein have recognized potential issues with such dedicated EGR cylinder configurations. In particular, EGR may be at the wrong level during transients. As an example, if there is a sudden increase in torque demand and a change in the throttle position to a more open position with a consequent drop in EGR demand, due to the specific location of EGR delivery, there may be manifold filling delays that result in more EGR residuals remaining in the manifold than desired. The long delay in purging the EGR residuals may lead to a drop in boosted engine performance. As another example, if there is a sudden decrease in torque demand and a change in throttle position to a more closed position with a consequent rise in EGR demand, due to the location of EGR delivery and resulting manifold filling delays, there may be fewer EGR residuals than desired. The long delay in filling the manifold with EGR may lead to a drop in engine performance. In both cases, combustion stability issues may also arise. While diverter valves may be used for diverting some or all of the exhaust from the dedicated EGR cylinder to an exhaust location during conditions when EGR is not required, the use of diverter valves may be cost prohibitive in addition to suffering from durability issues.

The inventors have recognized these and issues and have at least partly addressed them by a method for an engine that allows exhaust from the dedicated EGR cylinder to be routed to a plurality of locations based on engine operating conditions. The method comprises: selectively opening a plurality of exhaust valves of a dedicated EGR cylinder group to recirculate exhaust gas to remaining engine cylinders at each of a pre-compressor and a post-compressor location. In this way, EGR delivery locations and rates can be easily varied as engine operating conditions change.

In one example, an engine system may be configured with a single dedicated EGR (DEGR) cylinder for providing external EGR to all engine cylinders. Further, the engine may include a charge air cooler (CAC) integrated into the intake manifold allowing for compaction of the boosted engine system. The dedicated EGR cylinder may include a plurality of exhaust valves, for example three exhaust valves, and a single intake valve. A first exhaust valve may direct exhaust from the DEGR cylinder to the engine intake, downstream of the charge air cooler and downstream of an intake throttle, thereby allowing hot EGR to be delivered at a more downstream location of the intake manifold. A second exhaust valve may direct exhaust from the DEGR cylinder to the engine intake, upstream of the intake compressor, thereby allowing cooled EGR to be recirculated at a more upstream location of the intake manifold. Since the engine includes an integrated CAC, both the hot and cooled EGR is delivered into a smaller manifold volume, reducing manifold filling delays and expediting EGR filling even if a throttle position suddenly changes. A third exhaust valve may divert hot exhaust from the DEGR cylinder to the exhaust manifold, at a location upstream of an exhaust catalyst while bypassing the remaining engine cylinders. Thus, the third exhaust valve allows no EGR to be delivered to the engine. The plurality of exhaust valves may be operated with variable valve timing, such as through the use of a cam profile switching (CPS) mechanism, so that one or more of the exhaust valves are selectively activated at a given time. For example, the CPS mechanism may be used so that the dedicated EGR cylinder is operated in one of a plurality of modes based on engine operating conditions, the mode determining when and for how long each exhaust valve is opened during an exhaust stroke in the dedicated EGR cylinder group. As an example, during low load and/or low boost conditions, the dedicated EGR cylinder may be operated in a first mode where only the first exhaust valve is opened during the exhaust stroke so that hot EGR is delivered to the engine intake at a post-compressor location. Then, during high load and/or high boost conditions, the dedicated EGR cylinder may be operated in a second mode where only the second exhaust valve is opened during the exhaust stroke and cooled EGR is delivered to the engine intake at a pre-compressor location. In comparison, during engine cold-start or catalyst warm-up conditions, or when no engine dilution is required, the dedicated EGR cylinder may be operated in a third mode with only the third exhaust valve opened during the exhaust stroke to deliver hot exhaust to the exhaust catalyst while bypassing the engine cylinders. In still further examples, the timing of each of the exhaust valves may be adjusted so that they operate with varying degrees of overlap (e.g., only partial overlap).

In this way, a location of EGR delivery from a dedicated EGR cylinder group can be varied as operating conditions change in a boosted engine system. By allowing EGR to be selectively delivered to a pre-compressor and/or a post-compressor location based on engine load and boost conditions, combustion stability issues and EGR errors during transient changes in throttle position can be reduced. By introducing EGR to a pre-compressor location at higher engine loads and higher EGR rates, EGR cylinder-to-cylinder balance is improved while also providing additional EGR cooling through a charge air cooler. Furthermore, compressor surge risk is reduced. By varying the location of EGR delivery based on engine operating conditions, a discrepancy between the location where EGR is required at those conditions and the location where EGR is introduced is lowered, thereby reducing the amount of EGR delivery errors generated, as well as decreasing manifold filling times. As such, this reduces the likelihood of EGR being at the wrong level. In addition, the approach allows for simultaneous sourcing of cooled and uncooled EGR at a reduced rate along with some exhaust flow to the catalyst for light off maintenance. By adjusting the opening of a plurality of exhaust valves of a dedicated EGR cylinder group, the blow down portion of an exhaust stroke can be leveraged for improved EGR driving capability. Further, the exhaust can be routed to a pre-turbine location for improved turbocharger performance. Likewise, the exhaust opening may be adjusted to leverage the scavenging portion of the exhaust stroke for a greater concentration of unburned and partially burned hydrocarbons for improved EGR tolerance in the engine. By reducing EGR errors during transients, boosted engine performance, even with high engine dilution, is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 6 shows a table listing the various modes of operation of the dedicated EGR cylinder group.

DETAILED DESCRIPTION

Figure 1:
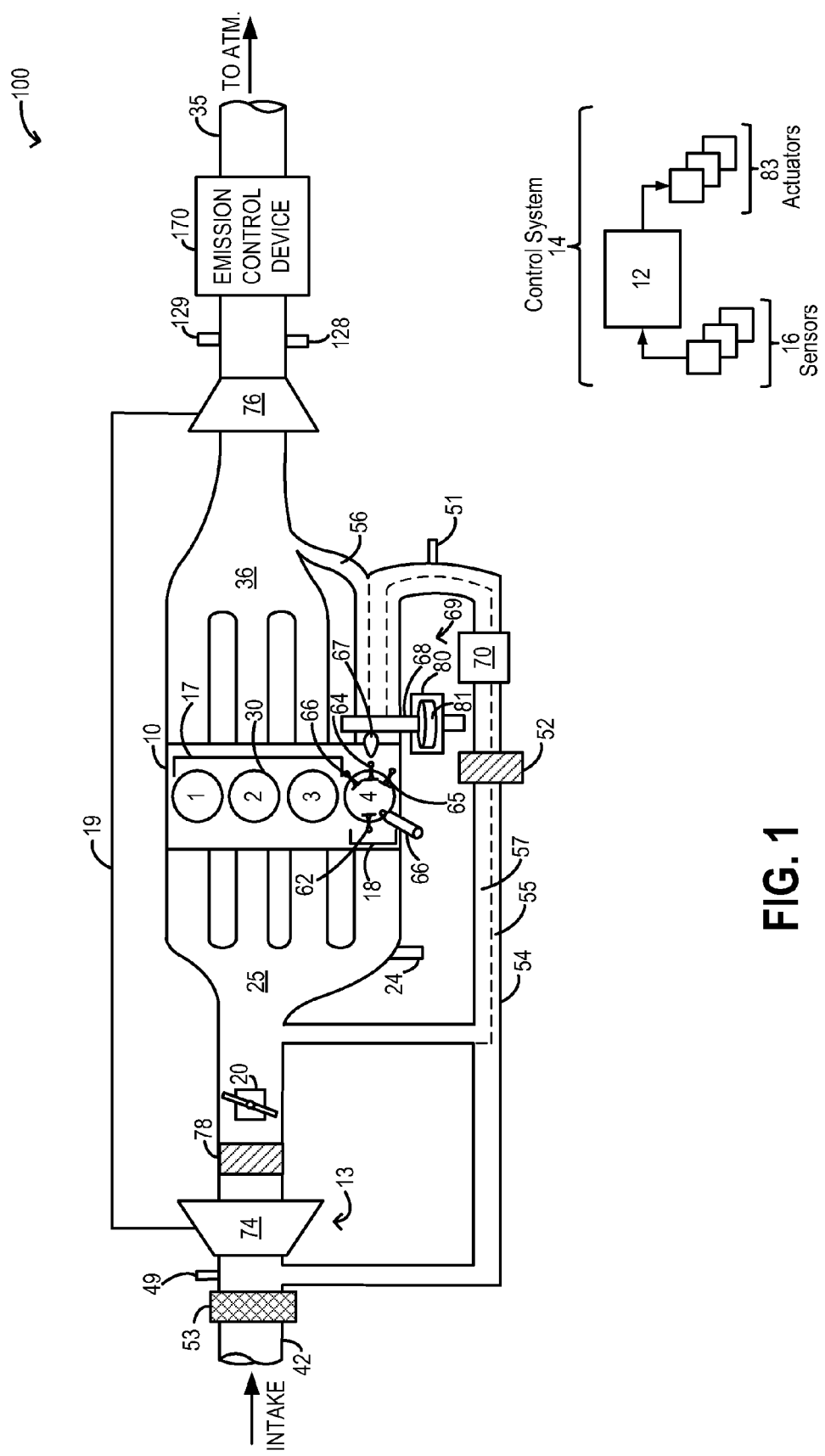
FIG. 1 is a schematic diagram of an engine system including a dedicated EGR donating cylinder group.
Figure 2:
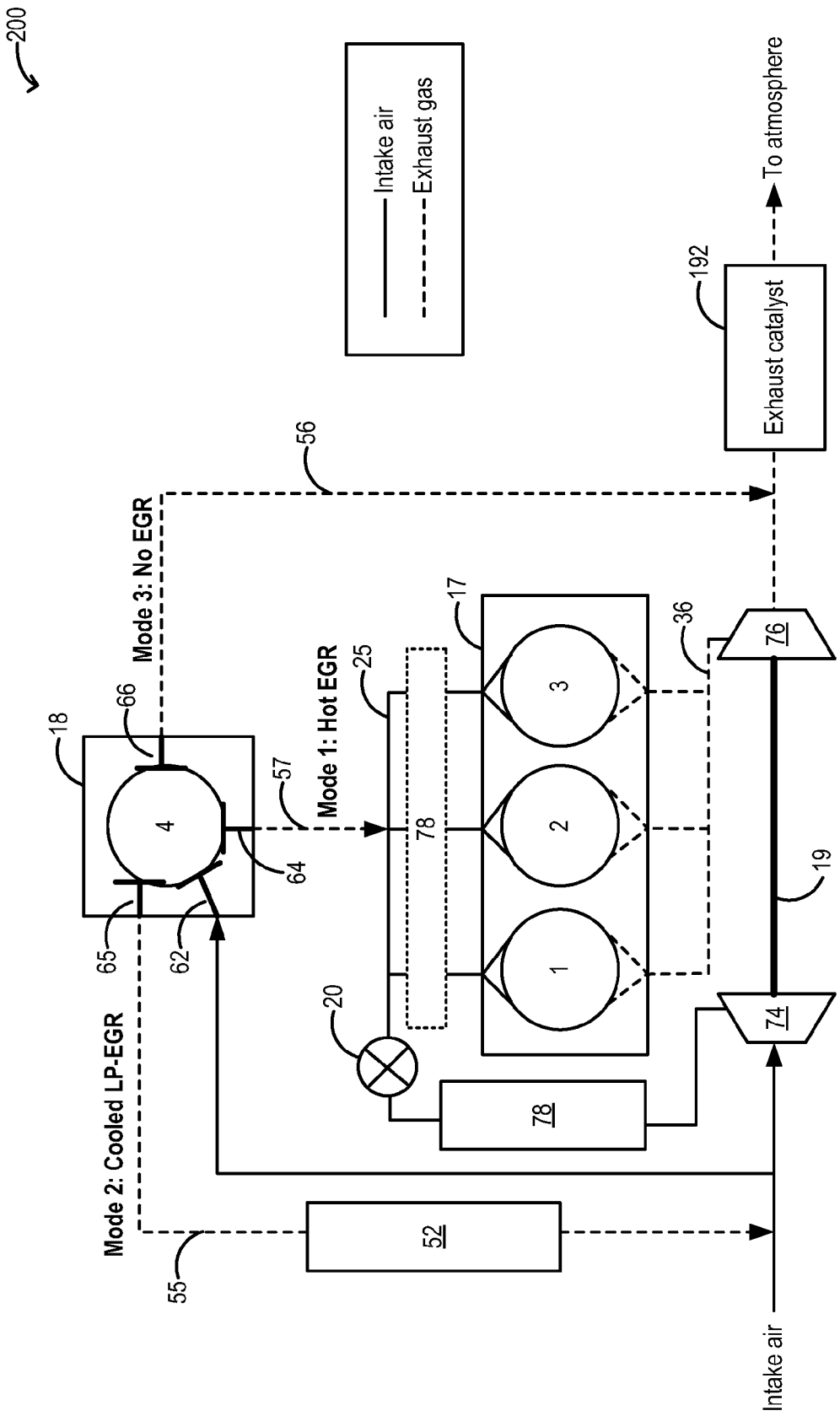
FIG. 2 shows a schematic depiction of the multiple exhaust valves of the dedicated EGR donating cylinder group in the different operating modes.
Figure 3:
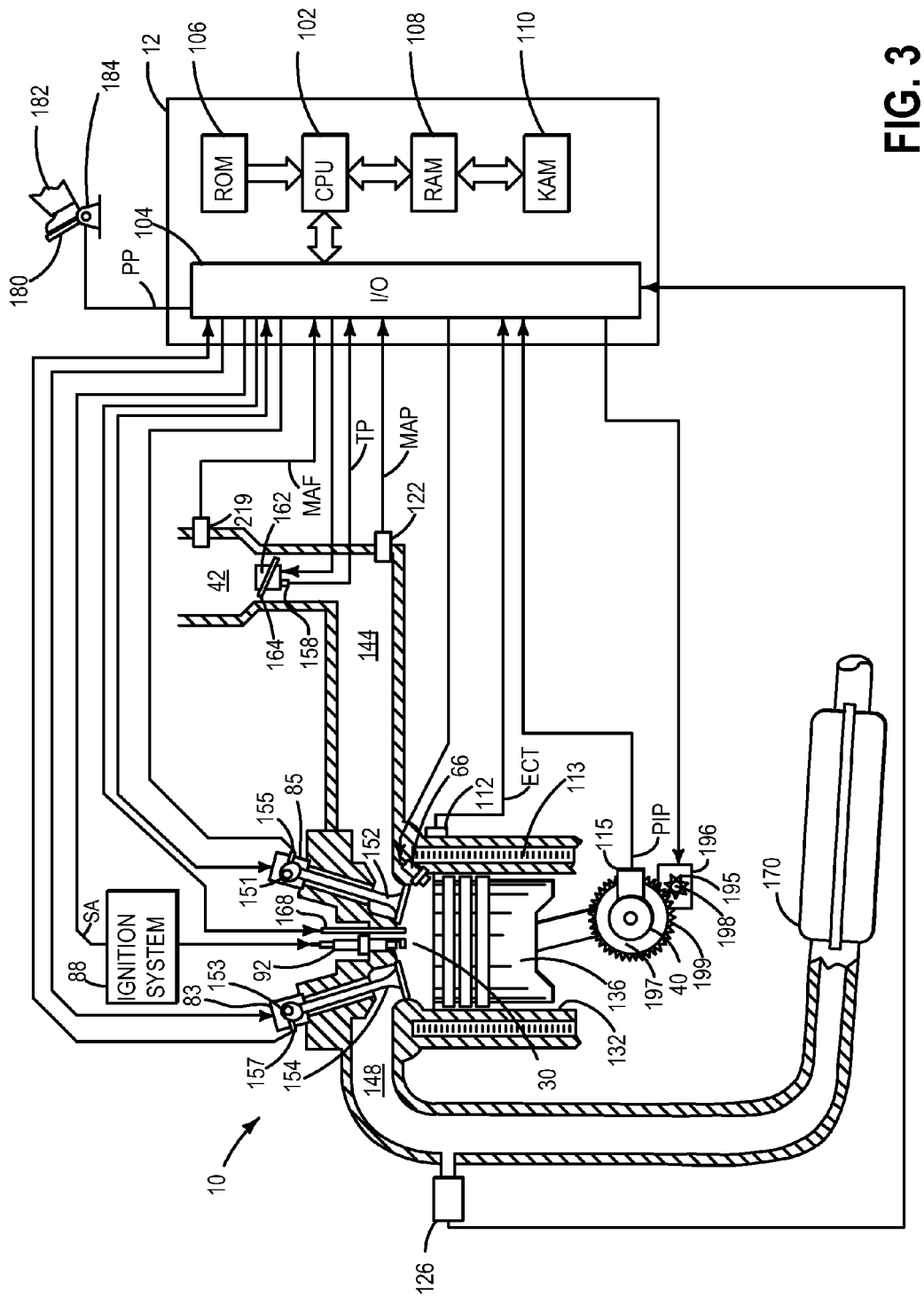
FIG. 3 is a schematic depiction of a combustion chamber of the engine.

The present description is related to EGR control on an engine operating with highly diluted cylinder mixtures, such as the engine systems of FIGS. 1-3. The engine cylinder mixtures may be diluted using recirculated exhaust gases (EGR) that are byproducts of combusting air-fuel mixtures. A dedicated EGR cylinder (or cylinder group) of the engine may be configured with a plurality of exhaust valves, the opening of each exhaust valve controlled via a cam profile switching mechanism so that the number and identity of exhaust valves that are open at a time, as well as a duration of exhaust valve opening, can be varied with engine operating conditions. A controller may be configured to perform a control routine, such as the routine of FIG. 4, to selectively open a plurality of exhaust valves based on EGR demand so that a location and rate of EGR delivery can be varied. For example, the controller may operate the dedicated EGR cylinder group in one of a plurality of modes (FIGS. 2 and 6), and transition between the plurality of modes (FIG. 5) as operating conditions change to vary the location of EGR delivery between a pre-compressor, a post-compressor and an exhaust catalyst location. Example exhaust valve adjustments for EGR control in a boosted engine system are shown with reference to FIGS. 7-8.

FIG. 1 schematically shows aspects of an example engine system 100 including an engine 10 with four cylinders (1-4). As elaborated herein, the four cylinders are arranged as a first cylinder group 18 consisting of dedicated EGR cylinder 4 and a second cylinder group 17 consisting of non-dedicated EGR cylinders 1-3. A detailed description of each combustion chamber of engine 10 is provided with reference to FIG. 3. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 53 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler (CAC) 78 to intake throttle 20. CAC 78 may be integrated into intake manifold 25 allowing for downsizing of the boosted engine. For example, the engine system may be manufactured in a first configuration (Configuration A) wherein the CAC is not integrated. Alternatively, the engine system may be manufactured in a second configuration (Configuration B) wherein the CAC is integrated. As elaborated with reference to the table of FIG. 6, each configuration may be operated in one of three operating modes wherein distinct HP-EGR and LP-EGR benefits are achieved.

Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown)

may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 25 is coupled to a series of combustion chambers 30 through a series of intake valves (see FIG. 3). The combustion chambers are further coupled to exhaust manifold 36 via a series of exhaust valves (see FIG. 3). Each cylinder 30 may be serviced by one or more valves. In the present example, cylinders of the second cylinder group (cylinders 1-3) may each include at least one intake valve and at least one exhaust valve (not shown). In comparison, cylinders of the first cylinder group (cylinder 4) may be configured with a single intake valve 62 and a plurality of exhaust valves. In the depicted embodiment, the first cylinder group includes each of a first, second, and third exhaust valve 64-66. In the depicted embodiment, the plurality of exhaust valves 64-66 of the dedicated EGR cylinder group are symmetrically sized. However in alternate embodiments, the plurality of exhaust valves of the dedicated EGR cylinder group may be asymmetrically sized. As an example, a larger exhaust valve may feed the exhaust route while smaller exhaust valves can feed the pre and post compressor recirculation routes. As another example, exhaust valves 64 and 65 may be sized to be larger than exhaust valve 66 such that more exhaust is recirculated to the pre-compressor and post-compressor locations of the intake manifold than exhaust is diverted to the exhaust turbine or catalyst.

In the depicted embodiment, exhaust manifold 36 includes a plurality of exhaust manifold sections to enable effluent from different combustion chambers to be directed to different locations in the engine system. In particular, effluent from the second cylinder group 17 (cylinders 1-3) is directed through turbine 76 of exhaust manifold 36 before being processed by an exhaust catalyst of emission control device 170. Exhaust from the first cylinder group 18 (cylinder 4), in comparison, is routed back to intake manifold 25 via EGR passage 54, and water-gas shift catalyst 70. Water gas shift (WGS) catalyst 70, positioned in EGR passage 54 is configured to generate hydrogen gas from rich exhaust gas received in passage 54 from cylinder 4.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the first cylinder group 18 (herein, cylinder 4) and EGR passage 54. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). By recirculating exhaust from one cylinder of the four-cylinder engine to the engine intake manifold, a nearly constant (e.g., around 25%) EGR rate can be provided. Cylinders 1-3 are also referred to herein as a non-dedicated EGR cylinder group. While the current example shows the dedicated EGR cylinder group as having a single cylinder, it will be appreciated that in alternate engine configurations, the dedicated EGR cylinder group may have more engine cylinders.

EGR passage 54 may include an EGR cooler 52 for cooling EGR delivered to the engine intake. In some embodiments, the dedicated EGR cylinder 4 can include variable valve timing on the intake and/or exhaust valves to vary EGR rate. In addition, EGR passage 54 may include an exhaust gas sensor 51 for estimating an air-fuel ratio of the exhaust recirculated from the first cylinder group to the engine intake. Optionally, a second exhaust gas sensor (not shown) may be positioned downstream of the exhaust manifold sections of the first cylinder group for estimating an air-fuel ratio of exhaust in the first cylinder group. Still further exhaust gas sensors may be included in the engine system of FIG. 1.

It will be appreciated that in some examples, integrated charge air cooler 78 may be sized to also perform EGR cooling. In such embodiments, the need for an EGR cooler is eliminated.

EGR passage 54 may include a first conduit 57 that enables the recirculated exhaust to be delivered to a post-compressor location (downstream of throttle 20), and a second conduit 55 that enables the recirculated exhaust to be delivered to a pre-compressor location (upstream of compressor 74, near a compressor inlet). EGR cooler 52 may be arranged in EGR passage 54 and specifically in EGR conduit 55 such that exhaust gas recirculated to the pre-compressor location is cooled before delivery while exhaust gas recirculated to the post-compressor location is not cooled before delivery. As a result, cooled low-pressure (LP) EGR is delivered to the pre-compressor location from the second exhaust valve while hot, uncooled EGR is delivered to the post-compressor location from the first exhaust valve. Alternatively, the EGR cooler 54 can be moved upstream and/or the CAC 78 integrated into the intake manifold, allowing cooled EGR to be delivered to either the pre- or post-compressor locations. Optionally, at least a portion of exhaust from the first cylinder group may be diverted to exhaust manifold 48 via bypass conduit 56. In the depicted example, conduit diverts exhaust to the exhaust manifold upstream of turbine 76. However, in alternate examples, the exhaust may be diverted to a location downstream of turbine 76, and upstream of an exhaust catalyst of emission control device 170. As elaborated herein, by varying a timing of exhaust valve operation of first cylinder group 18, exhaust from the dedicated EGR cylinder group may be recirculated to the intake via conduits 55, 57, and/or diverted to the exhaust catalyst via conduit 56.

A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Thus, to provide hydrogen enriched exhaust to engine cylinders 1-4, fueling of the second cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration)

EGR, before encountering any combustion stability issues. By increasing the range and amount of EGR usage, engine fuel economy is improved.

Engine system 100 further includes one or more camshafts for operating the intake and exhaust valves of the combustion chambers. For example, an intake camshaft (not shown) may be coupled via distinct cam lobes to the intake valve of the first cylinder group and the intake valve of each cylinder of the second cylinder group. The camshaft may be actuated to operate the corresponding intake valves via adjustments to the timing of the corresponding cam lobes. Each intake valve is actuatable between an open position that allows intake air into the corresponding cylinder and a closed position substantially blocking intake air from the cylinder. The intake camshafts may be included as part of an intake valve actuation system.

Exhaust camshaft 68 may be likewise included in exhaust valve actuation system 69. Exhaust camshaft 68 may be coupled to exhaust valves 64-66 of first cylinder group 18 (herein, cylinder 4). Exhaust camshaft 68 may include exhaust cam 67 which has a cam lobe profile for varying a timing and duration of opening exhaust valve 64 during an exhaust stroke of the first cylinder group. Likewise, exhaust cams with similar or different cam lobe profiles may be included coupled to exhaust valves 65 and 66. Each exhaust valve 64-66 is actuatable between an open position allowing exhaust gas out of the corresponding cylinder and a closed position substantially retaining gas within the cylinder. Based on the lobe profile of each exhaust cam, the corresponding exhaust valve may be opened at a different timing and for a different duration. The lobe profile may affect cam lift height, cam duration, and/or cam timing. A controller may be able to switch between exhaust valve operation by moving exhaust camshaft 68 longitudinally and switching between cam profiles. While exhaust camshaft 68 is shown coupled to the exhaust valves of first cylinder group 18, a similar exhaust camshaft (not shown) may be coupled to the exhaust valves of each cylinder of second cylinder group 17, the common exhaust camshaft actuated to operate the exhaust valves of all the coupled cylinders.

Exhaust valve actuation system 69 and intake valve actuation system (not shown) may further include push rods, rocker arms, tappets, etc. Such devices and features may control actuation of the intake valves and the exhaust valves by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. In still other examples, each of the exhaust valve and intake valve of one or more cylinders may be actuated by a common camshaft. Further still, in some examples, some of the intake valves and/or exhaust valves may be actuated by their own independent camshaft or other device.

Engine system 100 may include variable valve timing systems, for example, exhaust variable cam timing VCT system 80. VCT system 80 may be configured to open first exhaust valve 64 at a first timing and for a first duration during a first operating mode. The first operating mode may occur at lower engine load and/or lower boost pressures. First conduit 57 couples first exhaust valve 64 of the first cylinder group to the intake manifold, downstream of the intake compressor 74 (at a post-compressor location). Second conduit 55 couples second exhaust valve 65 of the first cylinder group to the intake manifold, upstream of the intake compressor (at a pre-compressor location). Third conduit 56 couples third exhaust valve 66 of the first cylinder group to the exhaust manifold, upstream of an exhaust catalyst of emission control device 170. As elaborated at FIGS. 2 and 4, by varying operation of camshaft 68, the opening and closing of exhaust valves 64-66 can be varied, thereby varying the location of EGR delivery as well as the rate of EGR delivery.

VCT system 80 may include exhaust camshaft phaser 81 coupled to exhaust camshaft 68 for changing exhaust valve timing. The VCT system may likewise include an intake camshaft phaser coupled to an intake camshaft for changing intake valve timing. VCT system 80 may be configured to advance or retard valve timing by advancing or retarding cam timing and may be controlled by controller 12. VCT system 80 may be configured to vary the timing of valve opening and closing events by varying the relationship between the crankshaft position and the camshaft position. For example, VCT system 80 may be configured to rotate intake camshaft 68 independently of the crankshaft to cause the valve timing to be advanced or retarded. In some embodiments, VCT system 80 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement at actuator from VCT system 80.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from a fuel tank. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 36 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO from the exhaust flow when the exhaust flow is lean, and to reduce the trapped NO when the exhaust flow is rich. In other examples, an exhaust after-treatment catalyst may be configured to disproportionate NO or to selectively reduce NO with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 83 based on the control decisions. For example, controller 12 may store computer-readable instructions in memory, and actuators 83 may be controlled via execution of the instructions. Example sensors include MAP sensor 24, MAF sensor 49, exhaust gas temperature and pressure sensors 128 and 129, and exhaust gas oxygen sensor 51. Example actuators include throttle 20, fuel injector 66, intake valve 62, and exhaust valves 64-66. Additional sensors and actuators may be included, as described in FIGS. 2-3. Storage medium read-only memory in controller 12 can be programmed with computer readable data representing instructions executable by a processor for performing the methods described below, as well as other variants that are anticipated but not specifically listed. An example method is described herein with reference to FIG. 4.

FIG. 2 shows a detailed embodiment 200 of the flow of exhaust from the dedicated EGR cylinder group to different locations in the engine during different operating modes. As such, components previously introduced in FIG. 1 are numbered similarly. It will be appreciated that while the depicted embodiment appears to show the dedicated EGR cylinder (cylinder 4) physically separate from the remaining engine cylinders (cylinders 1-3), this is meant to represent functional distinction. As such, the cylinders may be actually be arranged contiguously on an engine block, as illustrated in FIG. 1. In alternate examples, however, the dedicated engine cylinder group may be physically separate from the remaining engine cylinders, such as on distinct banks or a separate engine altogether.

Embodiment 200 shown engine 10 having an intake manifold 25 and an exhaust manifold 36, a turbocharger including an intake compressor 74 driven by an exhaust turbine 76 via a shaft; and a charge air cooler 78 in a pre-throttle position as shown by solid lines or alternatively integrated into the intake manifold in a post-throttle position, as shown by dashed lines. First dedicated EGR cylinder group 18 (herein cylinder number 4) includes an intake valve 62, and each of a first exhaust valve 64, a second exhaust valve 65, and third exhaust valve 66. Intake valve 62 draws intake air from upstream of the intake compressor into first cylinder group 18 or alternatively could draw boosted air from intake manifold 25.

A first conduit 57 couples the first exhaust valve 64 of the first cylinder group to the intake manifold, downstream of the intake compressor. The first conduit may be included within EGR passage 54. Herein, the EGR is also delivered downstream of the intake throttle 20. In this way, the dedicated EGR cylinder group is configured to recirculate hot EGR to the engine intake at a post-compressor location via the first exhaust valve and the first conduit when the CAC is not integrated into the intake manifold, or to recirculate cooled EGR to the engine intake at the post-compressor location via the first exhaust valve and the first conduit. In one example, the first exhaust valve may be selectively opened during a first operating mode at lower engine load and boost pressure to provide hot EGR to the engine via the first conduit. By delivering the hot EGR (or the cooled EGR in the configuration with the integrated CAC) to the engine downstream of the compressor in a smaller volume, EGR filling is expedited and EGR errors during transients are reduced. In addition, the hot (or cooled) EGR is delivered closer to the location where it is desired. Alternatively, the EGR cooler 52 could be included in passage 57 and/or the CAC 78 could be integrated into intake manifold 25, allowing for cooled EGR to be delivered post-compressor.

A second conduit 55 couples the second exhaust valve 65 of the first cylinder group to the air intake, upstream of the intake compressor. The second conduit may also be included within EGR passage 54 and may be arranged at least partially contiguous to first conduit 57. Herein, the EGR is also delivered upstream of the intake throttle 20. In this way, the dedicated EGR cylinder group is configured to recirculate cooled EGR to the engine intake at a pre-compressor location via the second exhaust valve and second conduit. The EGR may be cooled via the CAC at either the pre-throttle location (when the CAC is not integrated) or at the post-throttle location (when the CAC is integrated). In one example, the second exhaust valve may be selectively opened during a second operating mode at higher engine load and boost pressure to provide cooled low pressure EGR to the engine via the second conduit. By delivering the cooled EGR to the engine upstream of the compressor greater mixing length exists, allowing for more even distribution of EGR to the engine cylinders and avoidance of compressor surge issues during boosted operation.

A third conduit 56 couples the third exhaust valve 66 of the first cylinder group to the exhaust manifold at a location upstream of an exhaust catalyst 192 of the emission control device. The third conduit may also be included within EGR passage 54 but may be arranged offset from first and second conduits 55 and 57. In the embodiment of FIG. 2, conduit 56 is coupled downstream of turbine 76, although in alternate examples, such as shown in FIG. 1, conduit 56 may be coupled upstream of turbine 76. In this way, the dedicated EGR cylinder group is configured to divert exhaust gas to the exhaust catalyst to expedite catalyst warm-up and/or provide substantially no engine dilution. In one example, the third exhaust valve may be selectively opened during a third operating mode during an engine cold-start to provide no EGR to the engine. Routing of exhaust gas to the pre-turbine location can also improve boosted performance of the engine.

A cam profile switching device actuator may be coupled to each of the first, second, and third exhaust valve of the first cylinder group. A controller with computer-readable instructions may be included in the engine system and may be configured with code for adjusting a timing of opening of each of the first, second, and third exhaust valve during an exhaust stroke of the first cylinder group based on one or more of engine load, boost pressure, and engine dilution. For example, the adjusting may include, at lower engine load and boost pressure, opening and closing the first exhaust valve before closing the second and third exhaust valve during an exhaust stroke of the first cylinder group. The adjusting may further include, at higher engine load and boost pressure, opening and closing the second exhaust valve before closing the first and third exhaust valve. Further still, the adjusting may include, during an engine cold-start, opening and closing the third exhaust valve before closing the first and second exhaust valve. Herein, the controller may adjust a duration of opening of each of the first and second exhaust valve based on engine dilution demand while adjusting a duration of opening of the third exhaust valve based on a temperature of an exhaust catalyst coupled to the exhaust manifold. For example, the duration of opening of the first and second exhaust valve may be increased as the engine dilution demand increases, while the duration of opening of the third exhaust valve is increased as the exhaust catalyst temperature falls below a threshold.

A timing of opening of the exhaust valves may be adjusted such that there is no overlap between valve operations, or with at least partial overlap. By adjusting the timing of valve opening, the duration of valve opening, as well as the timing overlap between the exhaust valves, a rate and location of EGR delivery can be varied as engine operating conditions change. This allows EGR to be delivered to each of a pre-compressor and a post-compressor location while varying a ratio of EGR delivery between the locations based at least on engine load and boost pressure and while meeting engine dilution requirements. For example, a larger portion of EGR may be delivered to a pre-compressor location while a smaller portion of EGR is delivered to a post-compressor location during higher engine load and boost pressure conditions. As another example, a larger portion of EGR may be delivered to the post-compressor location while a smaller portion of EGR is delivered to the pre-compressor location during lower engine load and boost pressure conditions.

Referring now to FIG. 3, one cylinder of internal combustion engine 10 comprising a plurality of cylinders (as shown in FIGS. 1-2), is described. Engine 10 includes combustion chamber 30 and cylinder walls 132 with piston 136 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 144 and exhaust manifold 148 via respective intake valve 152 and exhaust valve 154. Each intake and exhaust valve may be operated independently by an intake cam 151 and an exhaust cam 153. Intake valve adjuster 85 advances or retards the phase of intake valve 152 relative to a position of crankshaft 40. Additionally, intake valve adjuster 85 may increase or decrease an intake valve lift amount. Exhaust valve adjuster 83 advances or retards the phase of exhaust valve 154 relative to a position of crankshaft 40. Further, exhaust valve adjuster 83 may increase or decrease an exhaust valve lift amount. The position of intake cam 151 may be determined by intake cam sensor 155. The position of exhaust cam 153 may be determined by exhaust cam sensor 157. In cases where combustion chamber 30 is part of a dedicated EGR cylinder, the timing and/or lift amount of valves 152 and 154 may be adjusted independently of other engine cylinders so that the cylinder air charge of the dedicated EGR cylinder may be increased or decreased relative to other engine cylinders. In this way, external EGR supplied to engine cylinders may exceed twenty five percent of the cylinder charge mass. External EGR is exhaust that is pumped out of exhaust valves of a cylinder and returned to cylinders via cylinder intake valves.

Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Fuel injector 166 is shown positioned to inject fuel directly into cylinder 30, which is known to those skilled in the art as direct injection. Alternatively, fuel may be injected to an intake port, which is known to those skilled in the art as port injection. In some example engine configurations, one or more engine cylinders may receive fuel from both direct and port fuel injectors.

In one example, fuel injector 166 may be a selectively deactivatable fuel injector. Thus, an engine cylinder may be selectively deactivated by turning off fuel to the given cylinder. In some embodiments, the dedicated EGR cylinder may be selectively deactivated by shutting off air instead of, or in addition to, shutting off fuel. For example, one of the intake valve and the exhaust valve(s) of the dedicated EGR cylinder may be deactivated, but not both. By deactivating either the intake valve or the exhaust valve, the pumping work of the cylinder may be increased. Maximizing pumping work of the dedicated EGR cylinder may also include adjusting cam phasing, valve lift, the position of a port throttle, or a charge motion control device, etc.

Intake manifold 144 is shown communicating with optional electronic throttle 162 which adjusts a position of throttle plate 164 to control air flow from air intake 42 to intake manifold 144. In some examples, throttle 162 and throttle plate 164 may be positioned between intake valve 152 and intake manifold 144 such that throttle 162 is a port throttle. Driver demand torque may be determined from a position of accelerator pedal 180 as sensed by accelerator pedal sensor 184. A voltage or current indicative of driver demand torque is output from accelerator pedal sensor 184 when driver's foot 182 operates accelerator pedal 180.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Controller 12 is shown in FIG. 3 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 113; a measurement of engine manifold pressure (MAP) from pressure sensor 122 coupled to intake manifold 44; an engine position sensor from a Hall effect sensor 115 sensing crankshaft 40 position; a measurement of air mass entering the engine from sensor 119; and a measurement of throttle position from sensor 158. Barometric pressure may also be sensed (sensor not shown) for processing by controller 12. In a preferred aspect of the present description, engine position sensor 115 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 136 moves to the bottom of the cylinder so as to increase the volume within combustion chamber 30. The position at which piston 136 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 30. The point at which piston 136 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Thus the components of FIGS. 1-3 provides for an engine system configured to selectively open a plurality of exhaust valves of a dedicated EGR cylinder group to recirculate exhaust gas to remaining engine cylinders at each of a pre-compressor and a post-compressor location. The system further enables a portion of the exhaust gas to be directed (e.g., concurrently) from the dedicated EGR cylinder to an exhaust catalyst while bypassing the remaining engine cylinders.

FIG. 6 shows a table 600 listing the different operating modes of the dedicated EGR cylinder group. Configuration A lists the different operating modes for the engine configuration that does not have an integrated CAC while configuration B lists the different operating modes for the engine configuration that does have an integrated CAC.

For both configurations, the engine controller may operate the dedicated EGR cylinder group in a first mode (Mode A) with a first exhaust valve open and each of a second and third exhaust valve closed to recirculate exhaust to an intake manifold, at a post-compressor location. Consequently, hot high-pressure EGR may be delivered to the engine in Configuration A while cooled high-pressure EGR may be delivered to the engine in Configuration B.

The controller may further operate the dedicated EGR cylinder group in a second mode (Mode B) with the second exhaust valve open and each of the first and third exhaust valve closed to recirculate exhaust to the intake manifold, at a pre-compressor location. Consequently, low pressure EGR cooled via the CAC at a pre-throttle location may be delivered to the engine in Configuration A while low pressure EGR cooled via the integrated CAC at a post-throttle location may be delivered to the engine in Configuration B.

The controller may further operate the dedicated EGR cylinder group in a third mode (Mode C) with the third exhaust valve open and each of the first and second exhaust valve closed to divert exhaust to an exhaust manifold while bypassing engine cylinders.

Figure 4:
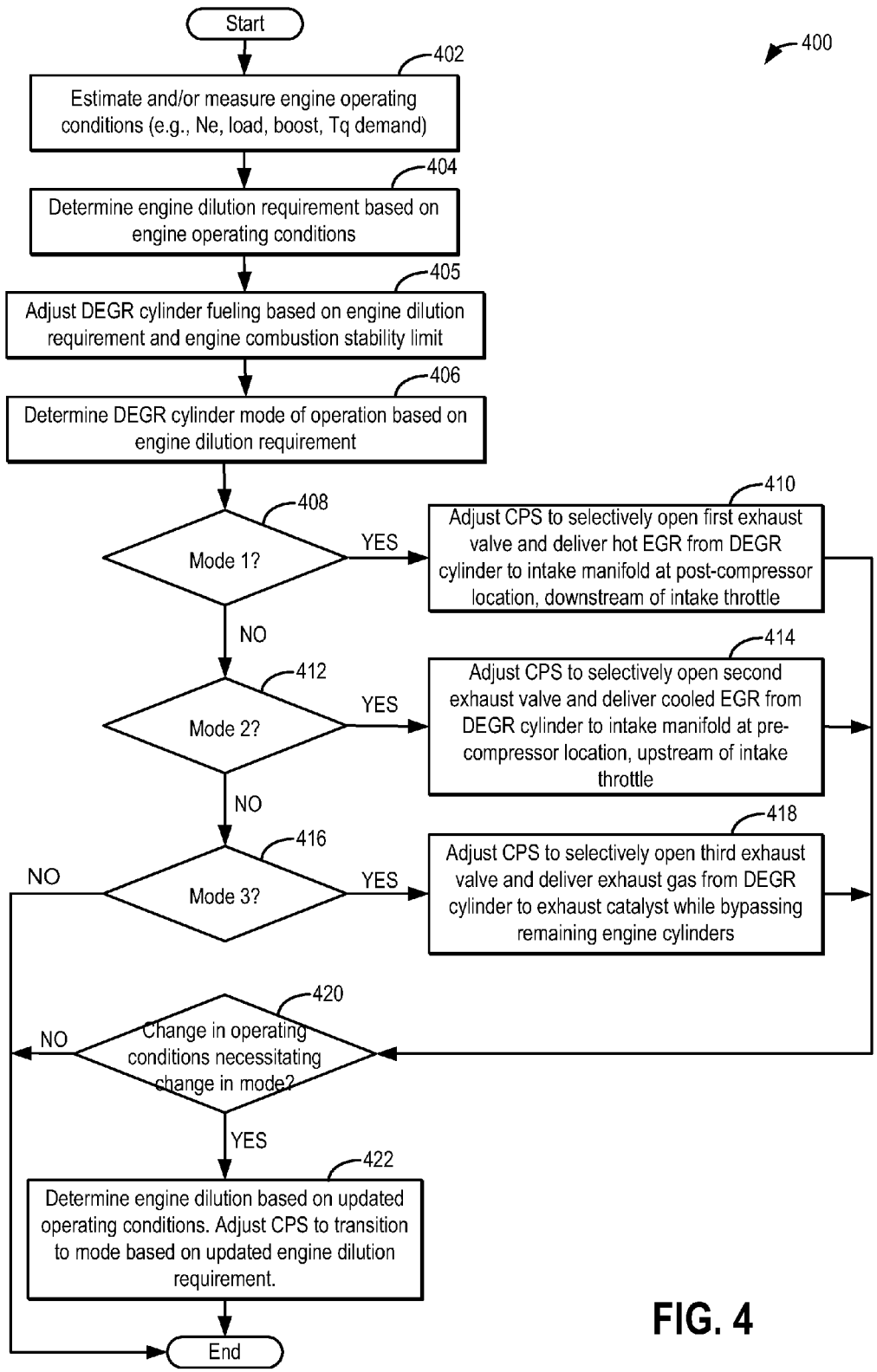
FIG. 4 show an example method for adjusting exhaust valve operation of the dedicated EGR cylinder group to vary EGR flow based on engine operating conditions.

Turning now to FIG. 4, an example method 400 is shown for adjusting exhaust valve operation of a dedicated EGR cylinder group of a multi-cylinder engine based on engine operating conditions to vary a location and rate of EGR flow based on varying EGR demand. The method allows exhaust to be recirculated from a dedicated EGR cylinder group to each of a pre-compressor and a post-compressor location. Further, the method allows at least some exhaust to be diverted to an exhaust catalyst while bypassing engine cylinders.

At 402, the routine includes estimating and/or measuring engine operating conditions such as engine speed, torque demand, engine load, boost, MAP, intake air flow, ambient conditions such as ambient pressure, temperature, humidity, exhaust catalyst temperature, etc. At 404, an engine dilution requirement is determined based on the engine operating conditions. In one example, the engine dilution requirement may be lower at lower engine loads and boost pressures, and higher at higher engine loads and boost pressures.

At 405, a fueling of the dedicated EGR cylinder group may be adjusted based on the engine dilution requirement and further based on the engine combustion stability limit at the current operating conditions. For example, if the combustion stability limit of the engine is lower, the EGR tolerance of the engine may be reduced. During such conditions, the dedicated EGR cylinder group may be fueled rich so as to operate the dedicated EGR (DEGR) cylinder group at an air-fuel ratio that is richer than stoichiometry. The WGS catalyst may use the hydrocarbon rich exhaust from the DEGR cylinder group to produce more combustible species such as CO and H2, which when rerouted into the engine via the intake manifold can increase the EGR tolerance of the engine by decreasing combustion instability and burn durations. As such, this increases the allowable EGR rate, improving the fuel economy benefit from the EGR. In one example, the degree of richness of fueling the DEGR cylinder is increased as the combustion stability limit of the engine decreases, for a given engine dilution requirement.

At 406, a mode of dedicated EGR cylinder operation is determined based on the engine dilution requirement and further based on the engine operating conditions. For example, the mode selection may be based on one or more of engine load and boost pressure. Selecting the mode may include determining whether the engine dilution requirement is to be met with hot EGR or cooled low pressure EGR. If both, a relative ratio of the hot EGR and the cooled LP-EGR may be determined. As such, the hot EGR includes EGR recirculated from the DEGR cylinder to the engine intake at a post-compressor location, downstream of the intake throttle and substantially directly into the intake manifold without passing through an EGR cooler. This direct delivery into the intake manifold reduces manifold EGR filling time. The cooled LP-EGR includes EGR recirculated from the DEGR cylinder to the engine intake at a pre-compressor location after cooling upon passage through an EGR cooler. The delivery of cooled EGR to the pre-compressor location reduces in cylinder heat losses, mitigates knock and reduces exhaust temperatures, thereby reducing enrichment requirements. The pre-compressor introduction point also improves EGR cylinder-to-cylinder balance and provides additional EGR cooling through the CAC, both needed at higher EGR rates and high loads. Selecting the mode may further include determining if no engine dilution is required and/or if catalyst warming is required. If catalyst warming is required, an amount of heat flux required at the exhaust catalyst may also be determined. As such, based on the heat flux required at the exhaust catalyst, an amount of hot exhaust to be diverted to the exhaust catalyst of the emission control device, while bypassing engine cylinders, may be determined. Specifically, as the catalyst temperature falls below a threshold temperature (such as a light-off temperature below which the exhaust catalyst is not activated), the heat flux required increases and more exhaust may need to be diverted to the catalyst. Likewise, during conditions when a rapid reduction in engine dilution is required, more of the exhaust from the DEGR cylinder group can be diverted away from the intake manifold and into the exhaust manifold. Based on the mode selection, the controller may actuate a cam profile switching (CPS) device including lobes coupled to each of the plurality of exhaust valves of the DEGR cylinder group to vary a timing of opening as well as a duration of opening of each of the plurality of exhaust valves.

At 408, it may be determined if a first mode has been selected. In one example, the controller may operate the dedicated EGR cylinder group in the first mode responsive to one or more of lower engine load (e.g., lower than a threshold load) and lower boost pressure conditions (e.g., lower than a threshold boost pressure). If the first mode is confirmed, at 410, the routine includes adjusting the CPS device coupled to the exhaust valves of the DEGR cylinder group to selectively open the first exhaust valve and deliver hot EGR from the DEGR cylinder to the intake manifold at the post compressor location. Specifically, the controller may operate the dedicated EGR cylinder group in a first mode with the first exhaust valve open and each of the second and third exhaust valve closed to recirculate exhaust to the intake manifold, at the post-compressor location, downstream of an intake throttle.

In one example, during the first mode, the first exhaust valve is opened and closed before an opening (and/or closing) of each of the second and third valve during an exhaust stroke of the dedicated EGR cylinder group. For example, during the first mode, only the first exhaust valve may be opened during the exhaust stroke while the second and third exhaust valves are maintained closed during the exhaust stroke. That is, the valves may operate mutually exclusively and with no valve overlap. In an alternate example, the valves may operate with at least some overlap such that the first valve is opened and closed before the other valves are opened or before the other valves are closed. For example, the first exhaust valve may be opened and closed during an earlier portion of the exhaust stroke while the remaining exhaust valves are opened and/or closed during a later portion of the exhaust stroke. The earlier opening exhaust valve could leverage the blow down portion of the exhaust stroke for improved EGR driving capability or be routed to the pre-turbine location for improved turbo performance. The later opening exhaust valve could leverage the scavenging portion of the exhaust stroke for a greater concentration of unburned and partially burned hydrocarbons for improved EGR tolerance in the engine.

In addition to adjusting a timing of opening the first exhaust valve, a duration of opening of the first exhaust valve may also be adjusted based at least on the EGR demand, the duration of opening increased as the EGR demand increases. The duration of opening may be increased by increasing a valve lift of the first exhaust valve, for example, via adjustments to the CPS device.

If the first mode is not confirmed, at 412, it may be determined if a second mode has been selected. In one example, the controller may operate the dedicated EGR cylinder group in the second mode responsive to one or more of higher engine load (e.g., higher than a threshold load) and higher boost pressure conditions (e.g., higher than a threshold boost pressure). If the second mode is confirmed, at 414, the routine includes adjusting the CPS device coupled to the exhaust valves of the DEGR cylinder group to selectively open the second exhaust valve and deliver cooled EGR from the DEGR cylinder to the intake manifold at the pre-compressor location. Specifically, the controller may operate the dedicated EGR cylinder group in a second mode with the second exhaust valve open and each of the first and third exhaust valve closed to recirculate exhaust to the intake manifold, at the pre-compressor location, upstream of the intake compressor.

In one example, during the second mode, the second exhaust valve is opened and closed before an opening (and/or closing) of each of the first and third valve during an exhaust stroke of the dedicated EGR cylinder group. For example, during the second mode, only the second exhaust valve may be opened during the exhaust stroke while the first and third exhaust valves are maintained closed during the exhaust stroke. That is, the valves may operate mutually exclusively and with no valve overlap. In an alternate example, the valves may operate with at least some overlap such that the second valve is opened and closed before the other valves are opened or before the other valves are closed. For example, the second exhaust valve may be opened and closed during an earlier portion of the exhaust stroke while the remaining exhaust valves are opened and/or closed during a later portion of the exhaust stroke. This would allow for simultaneous sourcing of cooled and uncooled EGR at a reduced rate along with some exhaust flow to the catalyst for light off maintenance.

In addition to adjusting a timing of opening the second exhaust valve, a duration of opening of the second exhaust valve may also be adjusted based at least on the EGR demand, the duration of opening increased as the EGR demand increases. The duration of opening may be increased by increasing a valve lift of the first exhaust valve, for example, via adjustments to the CPS device.

By selecting between the first and second modes, the controller may selectively open a plurality of exhaust valves of a dedicated EGR cylinder group to recirculate exhaust gas to engine cylinders at each of a pre-compressor and a post-compressor location. For example, the controller may adjust a timing of opening of the plurality of exhaust valves during an exhaust stroke of the dedicated EGR cylinder group so that the recirculating of exhaust gas to the pre-compressor location is mutually exclusive to the recirculating of exhaust gas to the post-compressor location. Alternatively, the controller may adjust a timing of opening of the plurality of exhaust valves during an exhaust stroke of the dedicated EGR cylinder group so that the recirculating of exhaust gas to the pre-compressor location at least partially overlaps the recirculating of exhaust gas to the post-compressor location.

If the second mode is not confirmed, at 416, it may be determined if a third mode has been selected. In one example, the controller may operate the dedicated EGR cylinder group in the third mode responsive to one of engine cold-start, catalyst warm-up, and engine idling conditions (where no engine dilution is requested). If the third mode is confirmed, at 418, the routine includes adjusting the CPS device coupled to the exhaust valves of the DEGR cylinder group to selectively open the third exhaust valve to direct exhaust from the DEGR cylinder group to an exhaust catalyst while bypassing the remaining engine cylinders. Specifically, the controller may operate the dedicated EGR cylinder group in a third mode with the third exhaust valve open and each of the first and second exhaust valve closed to divert exhaust gas away from the intake manifold and into the exhaust manifold, upstream of an exhaust catalyst and/or upstream of an exhaust turbine.

In one example, during the third mode, the third exhaust valve is opened and closed before an opening (and/or closing) of each of the first and second valve during an exhaust stroke of the dedicated EGR cylinder group. For example, during the third mode, only the third exhaust valve may be opened during the exhaust stroke while the first and second exhaust valves are maintained closed during the exhaust stroke. That is, the valves may operate mutually exclusively and with no valve overlap. In an alternate example, the valves may operate with at least some overlap such that the third valve is opened and closed before the other valves are opened or before the other valves are closed. For example, the third exhaust valve may be opened and closed during an earlier portion of the exhaust stroke while the remaining exhaust valves are opened and/or closed during a later portion of the exhaust stroke. This would be advantageous if the third mode is routed to the pre-turbine location so that the energy from the blow down pulse improves turbo performance, or routing the hottest gases to the post-turbine catalyst location for improved catalyst performance.

In addition to adjusting a timing of opening the third exhaust valve, a duration of opening of the third exhaust valve may also be adjusted based at least on the temperature of the exhaust catalyst, the duration of opening increased as the exhaust catalyst temperature falls below a threshold temperature (e.g., a light-off temperature). The duration of opening may be increased by increasing a valve lift of the third exhaust valve, for example, via adjustments to the CPS device.

From each of 410, 414, and 418, the routine proceeds to 420 to determine if there is a change in operating conditions necessitating a change in mode of operation. For example, the routine may transition operation between the different modes responsive to changes in one or more of engine load, boost pressure, or EGR demand. If no transition is required, the routine ends with the current mode of DEGR cylinder operation maintained. Else, at 422, an engine dilution requirement may be updated based on the updated engine operation conditions. The CPS device may then be actuated to transition between modes based on the updated engine dilution requirement. As elaborated with reference to the routine of FIG. 5, this may include, as non-limiting examples, transitioning from the first mode to the second mode responsive to an increase in engine load, transitioning from the second mode to the first mode responsive to a decrease in engine load, and transitioning from the third mode to the first mode responsive to sufficient exhaust catalyst warm-up.

Figure 5:
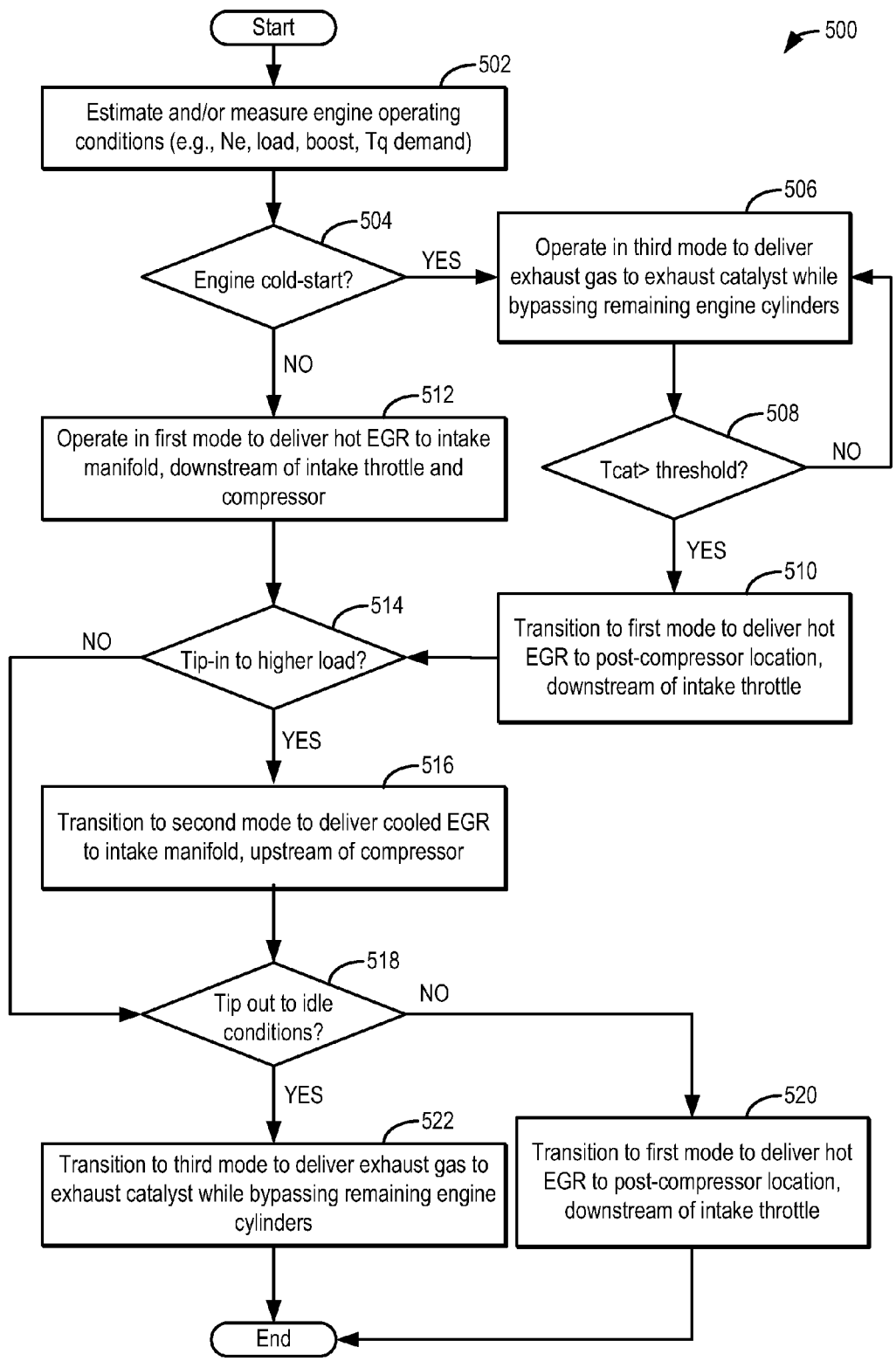
FIG. 5 shows an example routine for transitioning between the different operating modes of the dedicated EGR cylinder group responsive to changes in engine operating conditions.

Now turning to FIG. 5, an example routine 500 is shown for selecting an operating mode and transitioning between operating modes of a dedicated EGR cylinder group responsive to engine operating conditions.

At 502, as at 402, engine operating conditions may be estimated and/or measured. At 504, it may be determined if an engine cold-start condition is present. In one example, an engine cold-start may be confirmed if an exhaust catalyst temperature is lower than a threshold, such as lower than a light-off temperature. If an engine cold-start condition is confirmed, then at 506, the routine includes operating in the third mode with the third exhaust valve open to divert exhaust to the exhaust manifold upstream of an exhaust catalyst, while bypassing engine cylinders. The first and second exhaust valves may be concurrently closed during the exhaust stroke.

At 508, it may be determined if the exhaust catalyst is sufficiently warm, for example, if the exhaust catalyst temperature is higher than the threshold. If not, the dedicated EGR cylinder group may continue to be operated in the third mode. Else, at 510, the dedicated EGR cylinder group may be transitioned to a first mode with the first exhaust valve open to recirculate hot exhaust gas to the engine intake at a post-compressor location. The second and third exhaust valves may be concurrently closed during the exhaust stroke.

Returning to 504, if an engine cold-start condition is not confirmed, at 512, the routine includes operating the dedicated EGR cylinder group in the first mode with the first exhaust valve open to recirculate hot exhaust gas to the engine intake at a post-compressor location. The second and third exhaust valves may be concurrently closed during the exhaust stroke. In one example, the first mode may be a default mode of dedicated EGR cylinder operation. The first mode exhaust valve could be sized to provide a lower amount than 25% EGR to the engine cylinders as EGR tolerance is typically lower and lower engine loads. Furthermore, if the first mode EGR is uncooled or moderately cooled, this would be ideal for lower load conditions to improve combustion stability and lower pumping losses.

From 512 and 510, the routine moves to 514 to determine if there is a tip-in to higher engine loads. If yes, at 516 the routine includes transitioning the dedicated EGR cylinder group from the first mode to a second mode with the second exhaust valve open to recirculate cooled exhaust gas to the engine intake at a pre-compressor location. The first and third exhaust valves may be concurrently closed during the exhaust stroke. At higher engine loads cooling of the EGR is critical and under the low pressure configuration, the EGR is cooled via the EGR cooler and secondly through the CAC. Furthermore, at higher engine speeds and loads there is less time for EGR mixing, therefore the longer route traversed by the EGR provides for equal cylinder to cylinder distribution as well as smoother turbo operation with less compressor surge risk.

If a tip-in to higher loads is not confirmed at 514, as well as from 516, the routine moves to 518 to determine if there is a tip-out to idle conditions. If a tip-out to idle conditions is not confirmed, at 520 the routine includes transitioning back to the first mode once the tip-out event is completed. If a tip-out to idle conditions is confirmed, the routine includes transitioning to the third mode to deliver exhaust gas to the exhaust catalyst while bypassing engine cylinders.

In this way, exhaust from the dedicated EGR cylinder can be redirected to the main exhaust flow for fast catalyst light-off and fast engine warm-up. Likewise, when no EGR is required, the exhaust valve feeding the main exhaust flow port is activated. This enhances engine efficiency. In addition, the engine can be provided with high pressure or low pressure EGR as needed.

Figure 7:
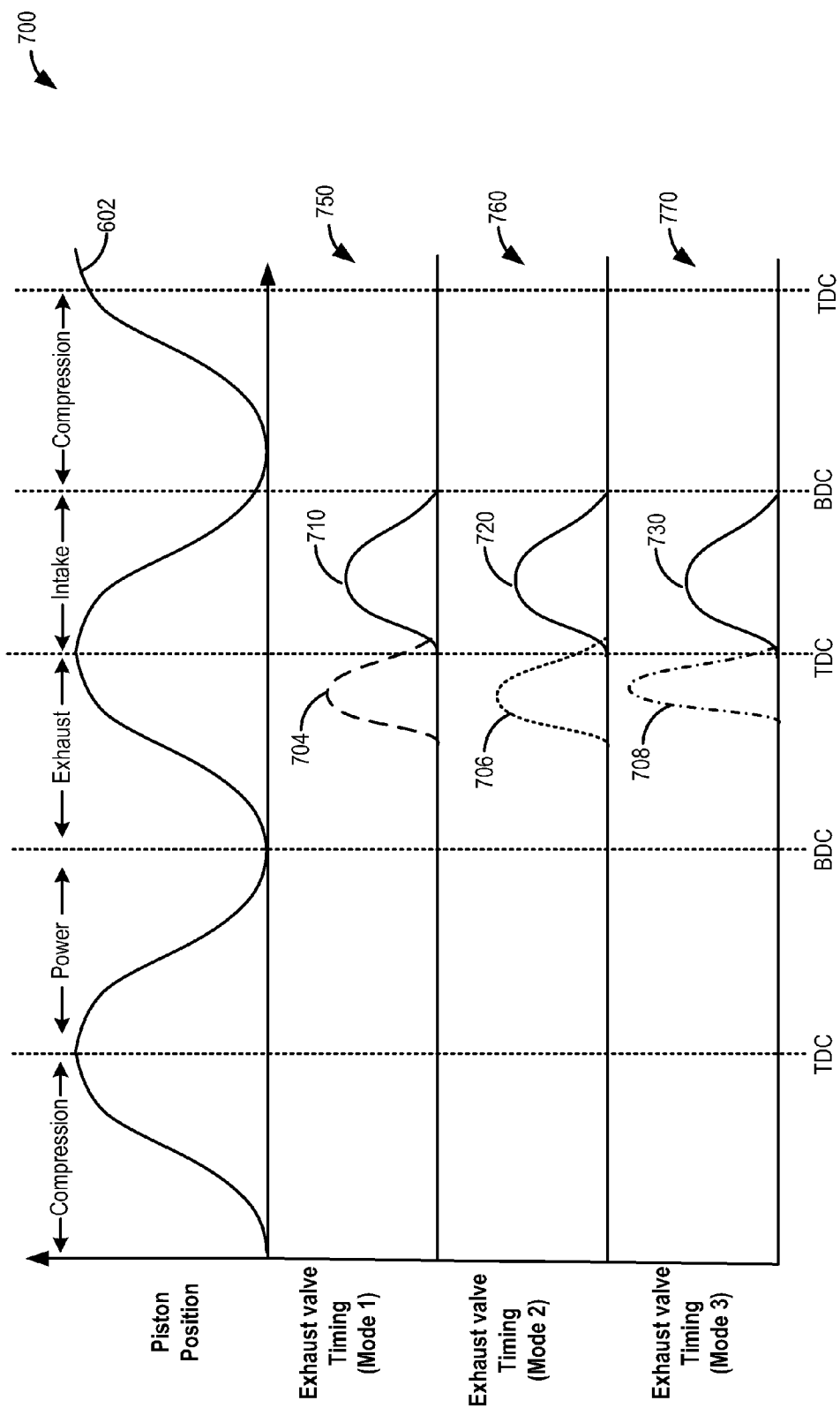
FIGS. 7-8 show example exhaust valve timings for a dedicated EGR cylinder group during different modes of operation.

Now turning to FIG. 7, map 700 depicts a set of example exhaust valve timings for a dedicated EGR cylinder during the different modes of operation. Map 700 depicts piston position in the different engine stroke at plot 702. Profiles 750-770 show example profiles for modes 1-3, respectively. Herein, in each mode, only one of the plurality of exhaust valves is selectively opened during the exhaust stroke, while the other exhaust valves are maintained closed for the entire duration of the exhaust stroke. In other words, the exhaust valves are operated mutually exclusive to each other. In each profile, intake valve timing is shown by a solid line (plots 710, 720, 730), and exhaust valve timing of the open exhaust valve is shown by different dashed line (plots 704, 706, 708).

Plot 702 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 602, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Plots 710, 720, 730 depict valve timings for an intake valve (solid line) during a first, second, and third mode of DEGR cylinder operation, at profiles 750, 760, and 770, respectively. As illustrated, in each mode, the intake valve may be opened at or before the start of an intake stroke, and may remain open at least until a subsequent compression stroke has commenced. Further, the intake valve may be operated with different amounts of valve lift and duration.

Profile 750 shows the exhaust valve timings during a first mode wherein exhaust gas is diverted via a first conduit to the engine intake at a location downstream of the compressor and downstream of an intake throttle. As shown, during the first mode, only the first exhaust valve (plot 704) may open and close during the exhaust stroke, while the second and third exhaust valves are maintained closed throughout the exhaust stroke. Herein, operation of the first valve is mutually exclusive to the operation of the second and third valves during the given exhaust stroke. In one example, during this mode, the engine is running primarily with uncooled EGR in a high pressure configuration.

Profile 760 shows the exhaust valve timings during a second mode wherein exhaust gas is diverted via a second conduit to the engine intake at a location upstream of the compressor. As shown, during the second mode, only the second exhaust valve (plot 706) may open and close during the exhaust stroke, while the first and third exhaust valves are maintained closed throughout the exhaust stroke. Herein, operation of the second valve is mutually exclusive to the operation of the first and third valves during the given exhaust stroke. In one example, this mode may be used at higher engine loads where higher amounts of cooled EGR is desired.

Profile 770 shows the exhaust valve timings during a third mode wherein exhaust gas is diverted via a third conduit to the engine exhaust manifold while bypassing the engine cylinders at a location upstream of an exhaust catalyst. As shown, during the third mode, only the third exhaust valve (plot 708) may open and close during the exhaust stroke, while the first and second exhaust valves are maintained closed throughout the exhaust stroke. Herein, operation of the third valve is mutually exclusive to the operation of the first and second valves during the given exhaust stroke. In one example, the third mode is operated during an engine cold-start.

In each of profiles 750-770, the exhaust valve lift closing point is just after TDC. However in alternate examples, the closing point may be just at TDC.

It will be appreciated that while the example of FIG. 7 shows only a single exhaust valve active at a given time, in alternate examples, two or all of the exhaust valves may be active at a given time.

For example, during a first mode wherein exhaust gas is diverted via a first conduit to the engine intake at a location downstream of the compressor and downstream of an intake throttle, the first exhaust valve may open and close first, during an earlier portion of the exhaust stroke, while the second and third exhaust valves are maintained closed. In particular, the first exhaust valve may open just as the piston bottoms out at the end of the power stroke. The second valve may open and close next, followed by operation of the third exhaust valve. In particular, the third valve may close as the piston completes the exhaust stroke. Herein, operation of each valve is non-overlapping with operation of any other exhaust valve during a given exhaust stroke. In alternate examples, operation of the exhaust valves may at least partially overlap. By varying the amount of valve lift, a duration and degree of valve opening is varied, thereby varying an amount of exhaust delivered via each exhaust valve. For example, the valve lift of the first exhaust valve may be increased relative to the valve lift of the remaining exhaust valves so that the engine is running primarily with uncooled EGR in a high pressure configuration but mixed with some cooled EGR in a low pressure configuration as well as a small amount of exhaust gas to the catalyst for heat maintenance.

During a second mode wherein exhaust gas is diverted via a second conduit to the engine intake at a location upstream of the compressor, the second exhaust valve may open and close first, during an earlier portion of the exhaust stroke, while the first and third exhaust valves are maintained closed. In particular, the second exhaust valve may open just as the piston bottoms out at the end of the power stroke. The first valve may open and close next, followed by operation of the third exhaust valve. In particular, the third valve may close as the piston completes the exhaust stroke. Herein, operation of each valve is non-overlapping with operation of any other exhaust valve during a given exhaust stroke. In alternate examples, operation of the exhaust valves may at least partially overlap. By varying the amount of valve lift, a duration and degree of valve opening is varied, thereby varying an amount of exhaust delivered via each exhaust valve. For example, the valve lift of the second exhaust valve may be increased relative to the valve lift of the remaining exhaust valves. As such, these scenarios may also exist at higher engine loads where higher amounts of cooled EGR is desired while still maintaining some uncooled HP-EGR and some flow to the exhaust for catalyst heat maintenance.

During a third mode wherein exhaust gas is diverted via a third conduit to the engine exhaust manifold while bypassing the engine cylinders at a location upstream of an exhaust catalyst, the third exhaust valve may open and close first, during an earlier portion of the exhaust stroke, while the first and second exhaust valves are maintained closed. In particular, the third exhaust valve may open just as the piston bottoms out at the end of the power stroke. The first valve may open and close next, followed by operation of the second exhaust valve. In particular, the second valve may close as the piston completes the exhaust stroke. Herein, operation of each valve is non-overlapping with operation of any other exhaust valve during a given exhaust stroke. In alternate examples, operation of the exhaust valves may at least partially overlap. By varying the amount of valve lift, a duration and degree of valve opening is varied, thereby varying an amount of exhaust delivered via each exhaust valve. For example, the valve lift of the third exhaust valve may be increased relative to the valve lift of the remaining exhaust valves. For example, during an engine cold-start, the third exhaust valve may be operated with a larger valve lift but for a shorter duration to enable faster warm-up. In one example, the third mode scenario is the most likely mode where only a single exhaust valve would be open, as normally the engine would not run rich, as is desired in EGR modes, and also send rich exhaust to the catalyst.

Figure 8:
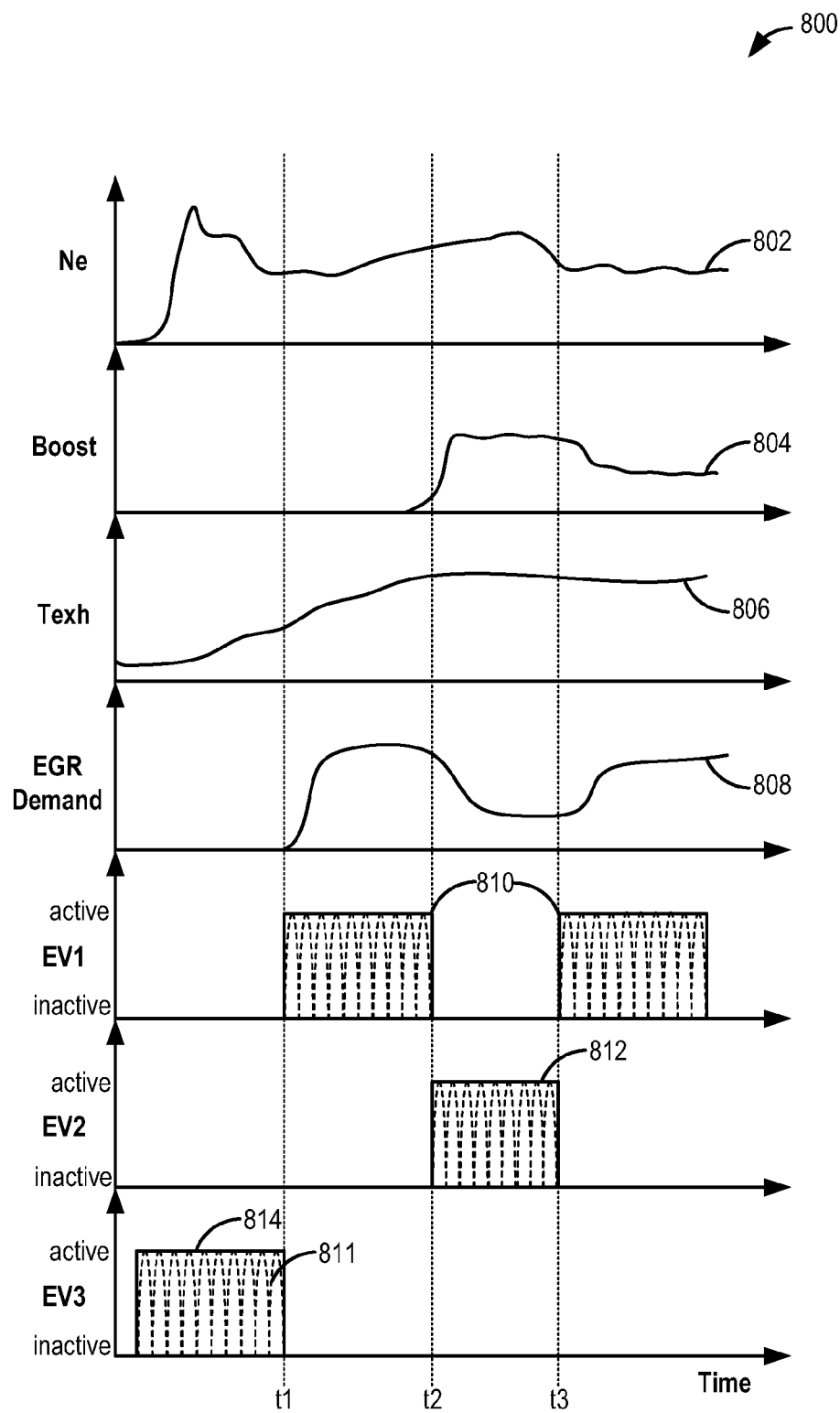

Now turning to FIG. 8, an example engine operation with EGR adjustment via selective opening of one of a plurality of exhaust valves of a dedicated EGR cylinder is shown. In particular, map 800 shows engine speed at plot 802, boost pressure at plot 804, exhaust temperature (Texh) at plot 806, and EGR demand at plot 808. Plot 810 shows when a first exhaust valve (EV1) of a DEGR cylinder coupling the cylinder to an intake manifold, downstream of the intake compressor, is active. Plot 812 shows when a second exhaust valve (EV2) coupling the DEGR cylinder to the intake manifold, upstream of the intake compressor, is active. Plot 814 shows when a third exhaust valve (EV3) coupling the DEGR cylinder to the exhaust manifold, while bypassing engine cylinders, is active.

It will be appreciated that a particular exhaust valve being active for a duration does not mean the exhaust valve is open for the duration. The exhaust valve being active means that the given exhaust valve is operational and is continually being fluctuated between open and closed states over each combustion event, as shown by dashed lines 811. It will be further appreciated that when a given exhaust valve is active, the duration of opening and degree of opening may vary. In one example, the valve parameters may be adjusted by varying valve lift.

At t0, an engine restart may be initiated. The engine restart may be an engine cold-start where the temperature of an exhaust catalyst is below its activation temperature. As such, during this time, engine dilution may not be required. Thus, between t0 and t1, as the engine is restarted and while the exhaust temperature, and exhaust catalyst temperature comes up, the third exhaust valve is activated while the first and second exhaust valves of the dedicated EGR cylinder are maintained inactive. Consequently, exhaust gas from the dedicated EGR cylinder is directed to the exhaust catalyst while bypassing the engine cylinders.

At t1, the exhaust temperature may be sufficiently high and the exhaust catalyst temperature may be above its activation temperature. Also at t1, engine speed and load may be at lower speed-load conditions. For example, engine speed may be at or above idling speed and engine load may be lower than a threshold load such that boost pressure is not required. During such low speed-load conditions, the EGR demand may be higher. Thus, to provide the requested engine dilution, at t1, the third exhaust valve may be deactivated while the first exhaust valve is activated. Further, the second exhaust valve may be maintained inactive. The first valve may be maintained active till t2. Consequently, exhaust gas is recirculated from the dedicated EGR cylinder to a post-compressor location to provide high pressure EGR.

At t2, due to a change in operator torque demand, the engine speed and load may increase. For example, engine load may be higher than a threshold load. In addition, boost pressure may be increased to meet the operator demand. During such high speed-load conditions, the EGR demand may be lower. Thus, to provide the requested lower engine dilution, at t2, the first exhaust valve may be deactivated while the second exhaust valve is activated. Further, the third exhaust valve may be maintained inactive. The second valve may be maintained active till t3. Consequently, exhaust gas is recirculated from the dedicated EGR cylinder to a pre-compressor location to provide cooled low pressure EGR.

At t3, engine operating conditions may change and engine speed-load may return to a lower range where EGR demand is higher and boost demand is lower. Thus, at t3, the second exhaust valve may be deactivated while the first exhaust valve is reactivated. Further, the third exhaust valve may be maintained inactive. Further, the engine may resume receiving EGR at a post compressor location from the dedicated EGR cylinder.

It will be appreciated that while the example of FIG. 8 shows only a single exhaust valve active at a given time, in alternate examples, two or all of the exhaust valves may be active at a given time. As an example, the first and second exhaust valve may be activated so that a relative amount of EGR delivered to pre- and post-compressor locations can be varied.

In this way, exhaust from a dedicated EGR cylinder group can be recirculated to an engine intake so as to provide each of high pressure and low pressure EGR. Further, the exhaust can be recirculated to provide each of hot EGR and cooled EGR, as desired. By activating one or more exhaust valves feeding exhaust from a dedicated EGR cylinder into an EGR passage when EGR is required, unique issues associated with low and high engine loads and EGR can be resolved. By activating an exhaust valve feeding exhaust from a dedicated EGR cylinder into an exhaust passage, while bypassing an EGR passage, a drop in engine dilution can be expedited when no EGR is required. In addition, exhaust can be diverted to an exhaust manifold to expedite turbine spin-up and catalyst warm-up during cold conditions. By delivering EGR at different locations of an engine having an integrated charge air cooler, manifold filling volume is reduced, allowing EGR level changes to be rapidly achieved, as demanded, during transients. By reducing EGR errors during transients, boosted engine performance, even with high engine dilution, is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
selectively opening a plurality of exhaust valves of a dedicated EGR cylinder group to recirculate exhaust gas to engine cylinders at each of a pre-compressor and a post-compressor location, the selectively opening based on one or more of engine load and boost pressure; and
wherein the selectively opening includes:
opening a first exhaust valve while maintaining remaining exhaust valves closed at lower load or lower boost pressure to recirculate exhaust from the dedicated EGR cylinder to the post-compressor location; and
opening a second, different exhaust valve while maintaining remaining exhaust valves closed at higher load or higher boost pressure to recirculate exhaust from the dedicated EGR cylinder to the pre-compressor location.

2. The method of claim 1, wherein the selectively opening includes adjusting a timing of opening of the plurality of exhaust valves during an exhaust stroke of the dedicated EGR cylinder group so that the recirculating of exhaust gas to the pre-compressor location is mutually exclusive to the recirculating of exhaust gas to the post-compressor location.

3. The method of claim 1, wherein the selectively opening includes adjusting a timing of opening of the plurality of exhaust valves during an exhaust stroke of the dedicated EGR cylinder group so that the recirculating of exhaust gas to the pre-compressor location at least partially overlaps the recirculating of exhaust gas to the post-compressor location.

4. The method of claim 1 further comprising, selectively opening a third exhaust valve while maintaining remaining exhaust valves closed during an engine cold-start or when no EGR is required to direct exhaust gas from the dedicated EGR cylinder to an exhaust catalyst while bypassing the engine cylinders.

5. The method of claim 1, wherein selectively opening the plurality of exhaust valves includes actuating a cam profile switching device including lobes coupled to each of the plurality of exhaust valves to vary a timing of opening and a duration of opening of each of the plurality of exhaust valves.

6. The method of claim 5, wherein the duration of opening each of the plurality of exhaust valves is based at least on engine EGR demand, the duration of opening increased as the engine EGR demand increases.

7. The method of claim 6, wherein increasing the duration of opening of an exhaust valve includes increasing a valve lift of the exhaust valve via adjustments to the cam profile switching device.

8. The method of claim 1, wherein the plurality of exhaust valves of the dedicated EGR cylinder group are symmetrically sized.

9. The method of claim 1, wherein the plurality of exhaust valves of the dedicated EGR cylinder group are asymmetrically sized.

10. A method, comprising:
operating a dedicated EGR cylinder group in a first mode with a first exhaust valve open and each of a second and a third exhaust valve closed to recirculate exhaust to an intake manifold, at a post-compressor location;
operating the dedicated EGR cylinder group in a second mode with the second exhaust valve open and each of the first and third exhaust valves closed to recirculate exhaust to the intake manifold, at a pre-compressor location; and
operating the dedicated EGR cylinder group in a third mode with the third exhaust valve open and each of the first and second exhaust valves closed to divert exhaust to an exhaust manifold while bypassing engine cylinders.

11. The method of claim 10, further comprising, transitioning operation between the modes responsive to one or more of engine load, boost pressure, and EGR demand.

12. The method of claim 11, wherein the operating in the first mode is responsive to one of lower engine load and lower boost pressure conditions, wherein operating in the second mode is responsive to one of higher engine load and higher boost pressure conditions, and wherein operating in the third mode is responsive to one of engine cold-start, catalyst warm-up, and engine idling conditions.

13. The method of claim 10, wherein during the first mode, the first exhaust valve is opened and closed before an opening of each of the second and third exhaust valves during an exhaust stroke of the dedicated EGR cylinder group, wherein during the second mode, the second exhaust valve is opened and closed before an opening of each of the first and third exhaust valves during the exhaust stroke, and wherein during the third mode, the third exhaust valve is opened and closed before an opening of each of the first and third exhaust valves during the exhaust stroke.

14. The method of claim 10, wherein diverting to the exhaust manifold when operating in the third mode includes diverting to the exhaust manifold upstream of an exhaust turbine and upstream of an exhaust catalyst.

15. An engine system, comprising:
an engine having an intake manifold and an exhaust manifold;
a turbocharger including an intake compressor driven by an exhaust turbine;
a charge air cooler integrated into the intake manifold;
a first cylinder including an intake valve, and each of a first, second, and third exhaust valve;
a first conduit coupling the first exhaust valve of the first cylinder to the intake manifold, downstream of the intake compressor;
a second conduit coupling the second exhaust valve of the first cylinder to the intake manifold, upstream of the intake compressor;
a third conduit coupling the third exhaust valve of the first cylinder to the exhaust manifold;

a cam profile switching device actuator coupled to each of the first, second, and third exhaust valves of the first cylinder;

a second cylinder having an intake valve and an exhaust valve coupled to the exhaust manifold; and a controller with computer-readable instructions for:

adjusting a timing of opening of each of the first, second, and third exhaust valves during an exhaust stroke of the first cylinder based on one or more of engine load, boost pressure, and engine dilution.

16. The system of claim 15, wherein the adjusting includes:

at lower engine load and boost pressure, opening and closing the first exhaust valve before closing the second and third exhaust valves;

at higher engine load and boost pressure, opening and closing the second exhaust valve before closing the first and third exhaust valves; and during an engine cold-start, opening and closing the third exhaust valve before closing the first and second exhaust valves.

17. The system of claim 16, wherein the controller includes further instructions for adjusting a duration of opening of each of the first and second exhaust valves based on engine dilution demand and adjusting a duration of opening of the third exhaust valve based on a temperature of an exhaust catalyst coupled to the exhaust manifold.

18. The system of claim 17, wherein the duration of opening of the first and second exhaust valves is increased as the engine dilution demand increases, and wherein the duration of opening of the third exhaust valve is increased as the exhaust catalyst temperature falls below a threshold.

* * * * *